Sept. 12, 1933.     H. O. FERRING     1,926,146
AUXILIARY RESERVOIR CONTROL
Filed April 22, 1931     2 Sheets-Sheet 2
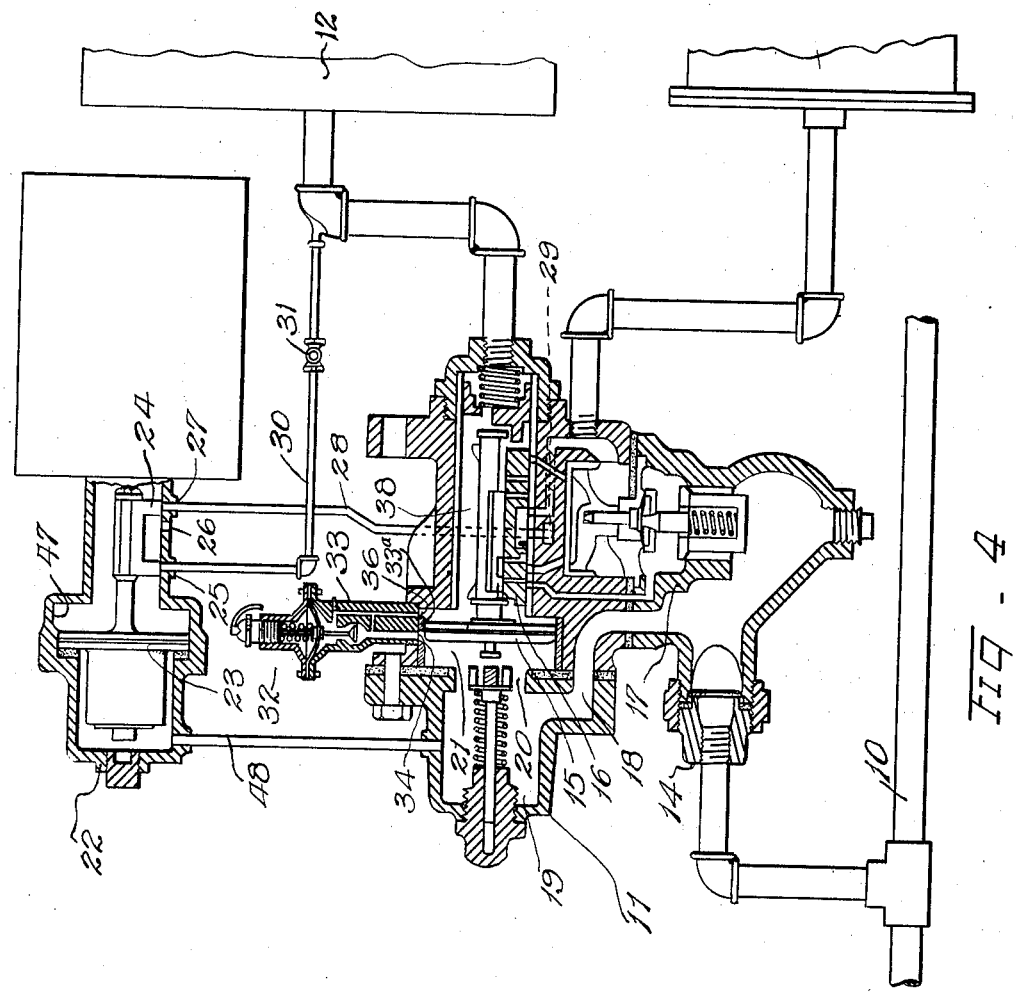
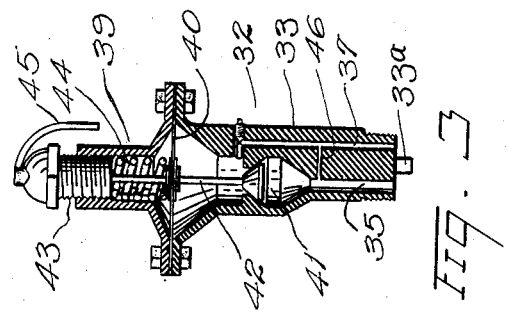
INVENTOR
BY Herbert O. Ferring
ATTORNEY Patented Sept. 12, 1933

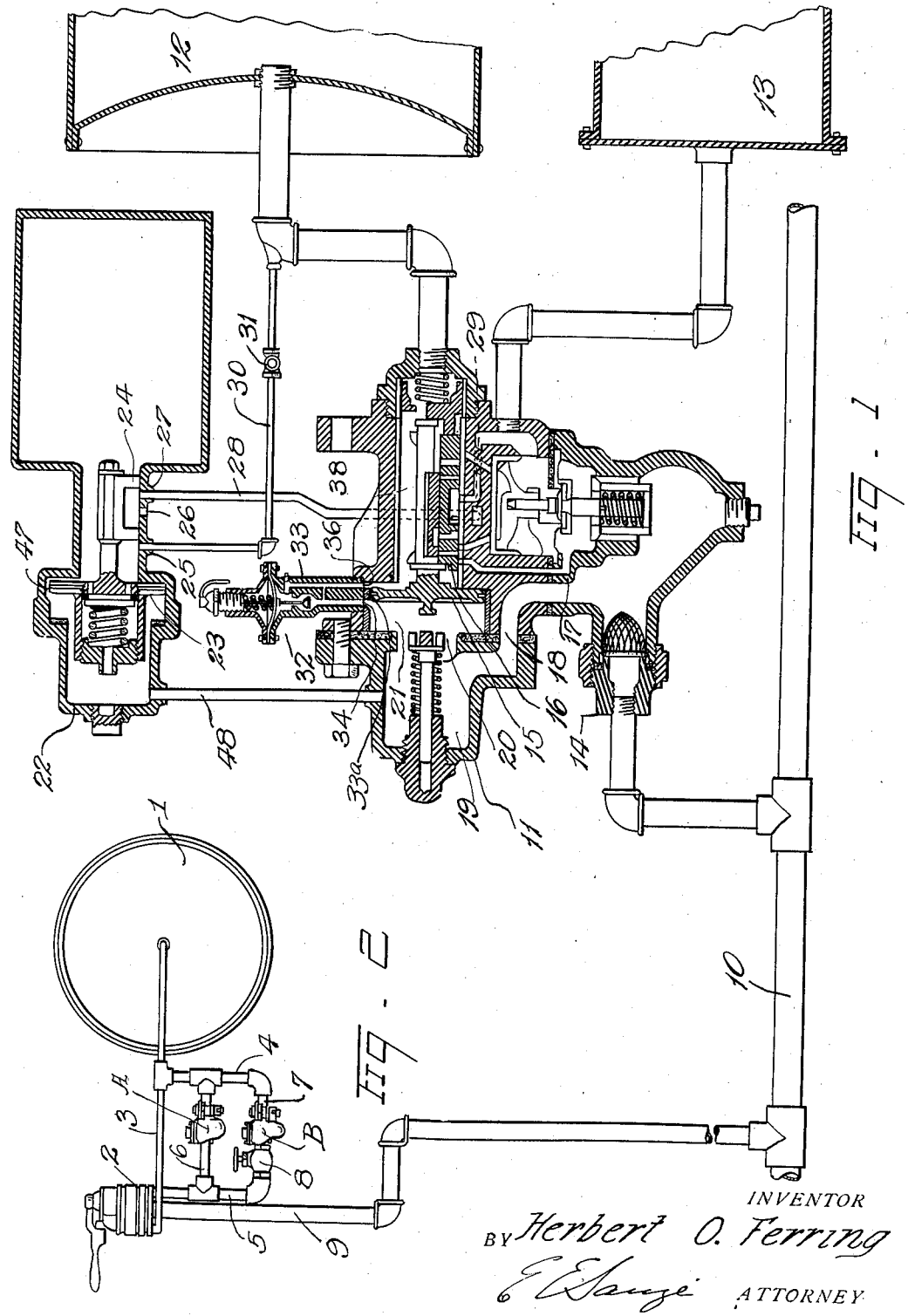

1,926,146

UNITED STATES PATENT OFFICE 1,926,146

AUXILIARY RESERVOIR CONTROL

Herbert O. Ferring, Pendleton, Oreg.

Application April 22, 1931. Serial No. 531,915

1 Claim. (Cl. 303—64)

This invention relates to auxiliary reservoir controls, more particularly adapted to air brake systems and has as one of its objects to provide an auxiliary reservoir control that will advantageously govern the charging and recharging of auxiliary reservoirs.

Another object of the invention is to provide an auxiliary reservoir control that will assist charging and recharging the successive auxiliary reservoirs of a train with greater uniformity.

A further object of the invention is to provide an auxiliary reservoir control that will assist charging and recharging the respective auxiliary reservoirs of an air brake system at a relatively rapid rate up to a certain predetermined and uniform pressure and then completing the charge of the auxiliary reservoirs substantially simultaneously.

A further object of the invention is to provide an auxiliary reservoir control that will augment the retarded release action of the triple valve, and by cooperation of a retaining valve charge an auxiliary reservoir direct without going through the feed grooves of the triple valve.

A further object of the invention is to provide an auxiliary reservoir control that will extend the action of the triple valve to provide a retarded release of the brakes of an increased number of cars from the front end of the cars back, over the present number.

A further object of the invention is to provide an auxiliary reservoir control that will release the brakes on the rear end of a long train in time, with relation to the brakes on the front end, to minimize harsh slack action taking place.

A further object of the invention is to provide an auxiliary reservoir control that may be embodied in new equipment or may be applied to old equipment without disturbing the action of the triple valve.

With these and other objects in view reference is now had to the accompanying drawings in which Fig. 1 is a sectional elevation of a triple valve, auxiliary reservoir, a brake cylinder, and a retaining valve;

Fig. 2 is a side elevation of the engineer's valve, showing feed valves and the main reservoir;

Fig. 3 is a sectional elevation of an auxiliary reservoir control, and

Fig. 4 is a similar view to that of Fig. 1 showing the triple piston in the full release position.

Having reference to the drawings like numerals refer to like parts throughout the several views, and the numeral 1 refers to a main reservoir which is located in direct communication with an air pump (not shown), and is connected with the engineer's valve by a main reservoir pipe line 3 whereby feed valves may be installed therein in convenient reach of the engineer, and whereby the brakes of the train may be conveniently controlled, through the medium of the engineer's valve.

The main reservoir 1 is a storage chamber for air under pressure with which to operate the brakes, and for engines and trains used in mountain districts, and when handling very long trains, said reservoir will carry a pressure of from 90 pounds up to approximately 135 pounds for use under extraordinary conditions.

In the specifications following and under the arrangement to be described, the invention is primarily adapted for use with a relatively high pressure in the main reservoir, but for the purpose of these specifications the main reservoir pressure will be assumed to be 90 pounds, and, with a train line pressure of 70 pounds in this part of the air brake system, will be used, as it is deemed that it will give a clearer understanding of the invention than would higher pressure which no doubt will prevail to handle long trains on heavy grades, for which the invention is adapted.

Where, however, it is necessary to show and explain the advantages of the additional pressure this will be specifically referred to.

The usual feed valves A and B are incorporated in the main reservoir line 3 for connection directly with the engineer's valve 2 and this assembly consists of a branch line 4 taken from the main reservoir line, a feed line 5 connected directly with the engineer's valve, an upper supply line 6 containing one of the feed valves A, set to deliver a certain predetermined pressure, and a lower supply line 7 containing the other of said feed valves B, set to deliver a certain predetermined pressure lower than that for which the upper valve is set, say about 10 pounds differential, and provided with a shut-off cock 8, with both of the supply lines completing the said branch line and feed line.

By this arrangement the main reservoir pressure may be communicated directly to the engineer's valve whereby the higher pressure may become available when necessary, as for instance, to quickly move the triple piston to the full release position to obtain a more rapid charge of the auxiliary reservoir, the upper feed valve A will reduce the pressure so that the pressure of 70 pounds is maintained automatically in the system when the triple piston is in a running position during which time the shut-off cock is closed and with the shut-off cock open the lower feed valve B will permit a lower pressure to enter the system, say at 60 pounds which pressure is desirable when using a retaining valve cooperable with the triple valve for a purpose to be explained.

A supply pipe 9 extends from the engineer's valve for suitable connection to a brake pipe 10 that extends throughout the length of the train to supply the triple valves 11, and which is commonly termed the train line, each car (not shown) having its own brake pipe, and each brake pipe being of the same diameter, or capacity, is provided on each of its ends with an angle cock (not shown) forming provisions for a hose connection between the respective brake pipes, in the usual manner of such construction and assembly, thus forming a train line throughout the entire train.

By the above arrangement means is also provided to supply air, under pressure, throughout the length of the train, wherewith to operate the braking system, and the operating means will now be described:

Beneath the car, and secured thereto, is an auxiliary reservoir 12 and a brake cylinder 13 communicatively joined together by the valve 11, the valve in turn having a third connection 14 communicating with the brake pipe and hence called a triple valve 11.

The triple valve, through its third connection 14, is supplied with air from the brake pipe 10 under suitable pressures selectively governed by the engineer's valve 2 which pressures act to operate an (equalizing) triple piston 15 contained within the said triple valve, the piston operating in turn to move a slide valve 16 contained in said triple valve 11, whereby to control the air flow therethrough necessary to control the train, and in the well known manner of such operation.

The air has access to the said piston 15 through the check valve case 17 of the triple valve, the air passage 18, the cylinder cap chamber 19, and the cylinder cap ports 20, into the equalizing cylinder 21, whereby the differential of pressure between the pressure in the brake pipe 10 and that of the auxiliary reservoir 12 acting on the piston 15, will cause the slide valve 16 to function in a manner well known to those skilled in the art.

Adjacent to the triple valve 11 is a retaining valve 22 which preferably communicates with the cylinder cap chamber 19 to receive its air directly from the brake pipe 10 and under the same pressure applied to the triple piston 15 of the triple valve, and this retaining valve 22 also contains a retaining valve equalizing piston 23 and a retaining valve slide valve 24 operable by said last named piston 23, and this retaining valve 22 is provided with an auxiliary reservoir port 25, an exhaust port 26, and a triple valve port 27, and is further provided with a pipe line 28 communicatively connecting the triple valve port 27 with the exhaust port 29 of the triple valve.

The auxiliary reservoir port 25 is provided with a pipe line 30 communicatively connected with the auxiliary reservoir 12 and this pipe line is provided with a check valve 31 set to open only by air passing from the retaining valve 22 to the auxiliary reservoir for a purpose to be explained.

It is well known that up to this time the triple valve 11 has been provided with a feed groove (not shown) consisting of an auxiliary reservoir groove formed in the triple piston and an equalizing cylinder groove formed in the equalizing cylinder, and that air from the brake pipe 10 will leak through these grooves and around the piston to charge the auxiliary reservoir when the triple piston is in the release position and that the remaining air in the brake pipe 10 will follow in the train line and throughout its length and by the said leak pass the triple pistons of the various triple valves of the respective cars of the train will charge the auxiliary reservoirs 12 of the train in successive order.

And further in the present operation of the triple valve the engineer, by causing a reduction of pressure in the train line below the pressure in the auxiliary reservoir, will, by the differential of pressure on the triple piston so caused, force the triple piston 15 outward and move the triple slide valve 16 to a position to provide communication between the auxiliary reservoir and the brake cylinder 13 allowing air to pass to the brake cylinder to apply the brakes. This is termed the service action and may be repeated in the usual well known manner.

By increasing the train line pressure over the consequently reduced pressure of the auxiliary reservoir the triple piston 15 is forced back to the retarded release position, releasing the brakes slowly on approximately the head 25 cars, when the main body of air will pass to the successive triple valves to successively bring these valves to the full release position to release the remaining brakes, with a small amount of air only being permitted to escape from the train line through the feed grooves in the retarded release position and a greater amount in the release position to recharge the respective auxiliary reservoirs.

Now, as it is essential that the air in the train line reach the rear end of the train with as near the initial selected pressure as possible from the engineer's valve, and as rapidly as possible, and as the train line friction will retard the flow to a certain degree, and as air escaping to the auxiliary reservoirs through the respective feed grooves would lower the pressure rapidly and in turn the velocity of movement in the train line, means is provided to substantially charge the entire train line and also to charge the respective auxiliary reservoirs uniformly to a certain predetermined pressure, say 60 pounds, with a differential of charging rate proportioned to the respective requirements of the auxiliary reservoirs and the train line so that this preliminary pressure of 60 pounds will obtain substantially throughout the system and up to this pressure.

For this purpose means is provided which consists of an auxiliary reservoir control 32 comprising a pressure operated valve, preferably of the diaphram type to prevent leakage, which valve consists of a body portion 33, see Fig. 3, threaded to engage the side wall of the triple piston (equalizing) cylinder at the point of location of the original cylinder tapered feed groove.

The feed groove in the cylinder wall of the triple valve is now changed by a block, represented as at 33a, intended to stop the groove, which block may be integral with the cylinder wall or may be integral with the control, as desired, to provide for an orifice 34, instead of a groove, extending through the cylinder wall, substantially radially and in a line to provide a passageway through the cylinder wall slightly ahead of the triple piston when in the full release position, to register with an air passageway 35 continued in the body 33 of the auxiliary reservoir control 32, while a second orifice 36 is provided also in the said cylinder wall, in position to register with the auxiliary reservoir groove of the piston and with a second air passageway 37 joining this orifice and positioned preferably parallel to the first air passageway 35, these passageways joining at their upper ends and forming a communicating channel, or main feed groove, extending from the triple piston cylinder to the slide valve chamber 38 through that part of the original feed groove formed back of the triple piston.

To control the flow of air through the auxiliary reservoir control a head 39 is provided for the body 33 and is secured thereto in a manner to secure a diaphram 40 that securely closes the said air passageways against leakage to atmosphere.

A valve 41 of any suitable type is now contained in the first mentioned air passageway 35 and is provided with an upwardly extending stem 42 that is suitably secured to the diaphram, and continuing upward is slidably engaged with an adjusting nut 43 being provided with a handle 45 for adjustment purposes.

By this means the spring 44 may be adjusted to hold the valve open against a pressure, say of 60 pounds, as before mentioned, whereby when the pressure in the train line (or the pressure in the auxiliary reservoirs) reach 60 pounds the said valves will automatically close under that pressure and thus close communication between the train line and the auxiliary reservoirs so far as this main feed groove is concerned.

As our normal train line pressure is considered to be substantially 70 pounds, as above explained, and as the pressure in the auxiliary reservoir has now reached 60 pounds means must be provided whereby the auxiliary reservoir pressure may be made to equal the pressure of the train line therefore an intercommunicating feed groove 46 is provided that will by-pass the said valve 41 independent of the valve action which intercommunicating groove is made of sufficiently small bore that air may pass from the brake pipe through the control by this small feed groove 46 and enter into the auxiliary reservoir at a final charging rate that will not interfere with maintaining the 70 pounds pressure in the train line, which pressure was attained in a comparatively short period of time after attaining the 60 pounds pressure and which now closes the valve 41 in the control.

This may be readily understood by considering that there may be provided 90 pounds or more pressure in the main reservoir and that this pressure provides a reserve over the pressure permitted by the feed valve A and hence when the valve in the control prevents further drainage from the train line by closing, after it has reached 60 pounds the reserved pressure is available immediately to endeavor to raise the pressure in the train line to substantially the 70 pounds.

Then with 70 pounds in the train line and a reserve of pressure the loss or drain through the small feed groove 46 is amply compensated for by the reserve which is also ample to maintain the pressure substantially uniform throughout the length of the train line.

Where a retaining valve 22 is operated in conjunction with the triple valve 11, which retaining valve forms the subject matter contained in my Patent No. 1,742,383 and dated January 7, 1930 which retaining valve is provided with a feed groove 47 of similar cross section to that of the by pass feed groove 46 provided in the control and as the piston 23 of the retaining valve is set to operate similarly to the triple piston of the triple valve it is obvious that it may be substituted therefor in which case the intercommunicating feed groove 46 may be omitted in the control.

This retaining valve is in direct communication with the brake pipe air by means of the pipe 48 and is supplied with the pipe 30 leading to the auxiliary reservoir whereby the small amount of air passing the feed groove of the retainer will pass to the auxiliary reservoir to obtain the same results as before.

This pipe 30, is provided with the check valve 31, as before mentioned, operating at substantially 0 pound pressure, and the check valve is utilized to prevent loss of air from the auxiliary reservoir through the auxiliary reservoir pipe line should a leak occur past the check valve or in any part of the retaining valve or train line system on the opposite side of the check valve from the auxiliary reservoir.

It is now obvious that with the triple piston in the full or retarded release position that as soon as the air pressure reaches 60 pounds or more that the feed groove in the control will be automatically closed so that the only leak-back that can occur would be through the small communicating passage around the valve therein and as this groove is comparatively small (of smaller bore than the triple piston feed groove) and as the period of time that air will be permitted to pass through this small groove is comparatively short the loss due to leak back will be immaterial so that practically all of the pressure of the auxiliary reservoir is made available for braking purposes.

In the application or service position on long trains more brakes will set at the same reduction than at present and hence more uniform braking power throughout the train will be obtained.

In using this control and in setting the brakes it is deemed preferable that the normal train line pressure be raised to 75 pounds, or 5 pounds more than is approved as standard in many parts of the country, as in ordinary practice the reduction is seldom more than 15 pounds, then, by having 75 pounds the control still holds the main feed groove closed and provides 60 pounds in the brake pipe, so when the triple piston is forced back to release or hold the brakes, by an increasing train line pressure, as while the train is in motion, the small feed groove provides the only means of loss from the train line, the greater pressure then obtains at the rear of the train more quickly than before and thus provides to release the brakes in consecutive order and in a manner to prevent any harsh slack action.

Having thus described my invention, I claim

In an auxiliary reservoir control, the combination with an auxiliary reservoir, a train pipe, and a triple valve, said triple valve having an equalizing cylinder and an equalizing piston, and provided with feed grooves, for controlling communication between the auxiliary reservoir and the train line, of means to block said feed grooves, a controlling means mounted in said equalizing cylinder and consisting of a body provided with enlarged substitute feed grooves registering with the equalizing cylinder in the location of the original grooves, an adjustable diaphragm valve provided in said substitute grooves and disposed to automatically close said grooves at an increased and predetermined differential of pressure to provide a more rapid and uniform initial charging rate of said auxiliary reservoir, and means to bypass said valve and complete the charging at a lower rate.

HERBERT O. FERRING.